(12) United States Patent
Sawada et al.

(10) Patent No.: US 8,109,445 B2
(45) Date of Patent: Feb. 7, 2012

(54) DATA CARRIER AND DATA CARRIER SYSTEM

(75) Inventors: Kikuzo Sawada, Tokyo (JP); Yoshikazu Sugawara, Tokyo (JP); Takashi Kubo, Tokyo (JP)

(73) Assignee: Yoshikawa RF Systems Co., Ltd., Fukuoka (JP)

( * ) Notice: Subject to any disclaimer, the term of this patent is extended or adjusted under 35 U.S.C. 154(b) by 368 days.

(21) Appl. No.: 12/439,128

(22) PCT Filed: Aug. 30, 2007

(86) PCT No.: PCT/JP2007/066898
§ 371 (c)(1),
(2), (4) Date: Feb. 26, 2009

(87) PCT Pub. No.: WO2008/026692
PCT Pub. Date: Mar. 6, 2008

(65) Prior Publication Data
US 2010/0243731 A1    Sep. 30, 2010

(30) Foreign Application Priority Data

Aug. 31, 2006  (JP) ................................. 2006-234967

(51) Int. Cl.
*G06K 19/06* (2006.01)
(52) U.S. Cl. ........................ 235/492; 235/487
(58) Field of Classification Search .................. 235/492, 235/487, 375; 361/737
See application file for complete search history.

(56) References Cited

U.S. PATENT DOCUMENTS

| 6,126,071 | A  | * | 10/2000 | Yoshimura ..................... 235/382 |
| 6,256,690 | B1 | * | 7/2001 | Carper ........................... 710/301 |
| 6,480,935 | B1 | * | 11/2002 | Carper et al. .................. 711/115 |
| 6,484,948 | B1 | * | 11/2002 | Sonoda .......................... 235/492 |
| 7,059,533 | B2 | * | 6/2006 | Van Rens ....................... 235/492 |
| 7,669,003 | B2 | * | 2/2010 | Sinclair et al. ................ 711/103 |
| 2003/0163717 | A1 | | 8/2003 | Yoshimoto et al. |
| 2004/0050942 | A1 | | 3/2004 | Ueda et al. |
| 2004/0250037 | A1 | | 12/2004 | Takemura et al. |
| 2009/0314831 | A1 | * | 12/2009 | Pluss et al. .................... 235/375 |

FOREIGN PATENT DOCUMENTS

| JP | 2000-285207 A | 10/2000 |
| JP | 2001-134151 | 5/2001 |
| JP | 2003-256282 A | 9/2003 |
| JP | 2004-86870 A | 3/2004 |
| JP | 2004-310557 A | 11/2004 |
| JP | 2005-346138 A | 12/2005 |

* cited by examiner

*Primary Examiner* — Ahshik Kim
(74) *Attorney, Agent, or Firm* — Arent Fox LLP

(57) ABSTRACT

A region to store authentication commands to perform authentication between a data carrier and a reader/writer device is divided into at least three areas, and as for the three areas, a first authentication command is stored in a first area, a second authentication command is stored in a second area, and a third authentication command is stored in a third area, and security levels can be selected depending on a command of an inquiry signal (41) transmitted from a reader/writer device (10), and thereby selection of the security level suitable for circumstances can be realized by a simple constitution.

16 Claims, 6 Drawing Sheets

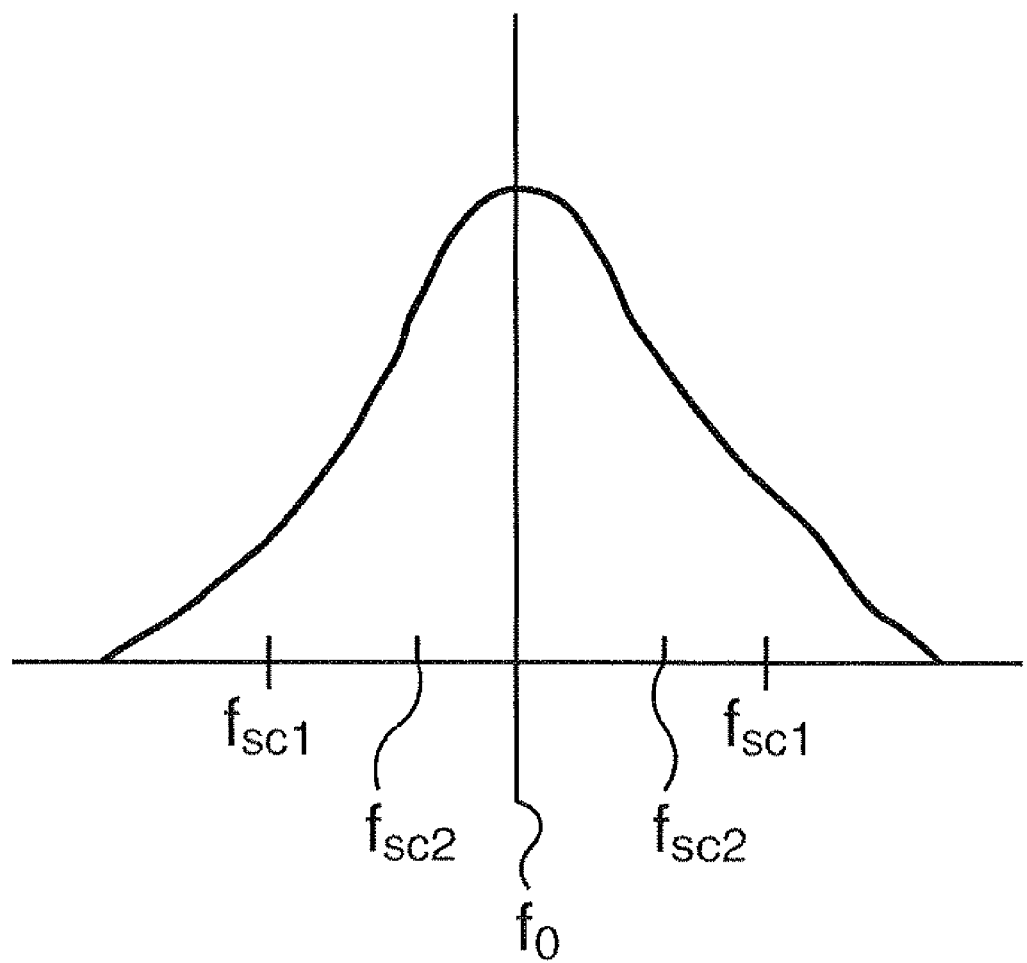

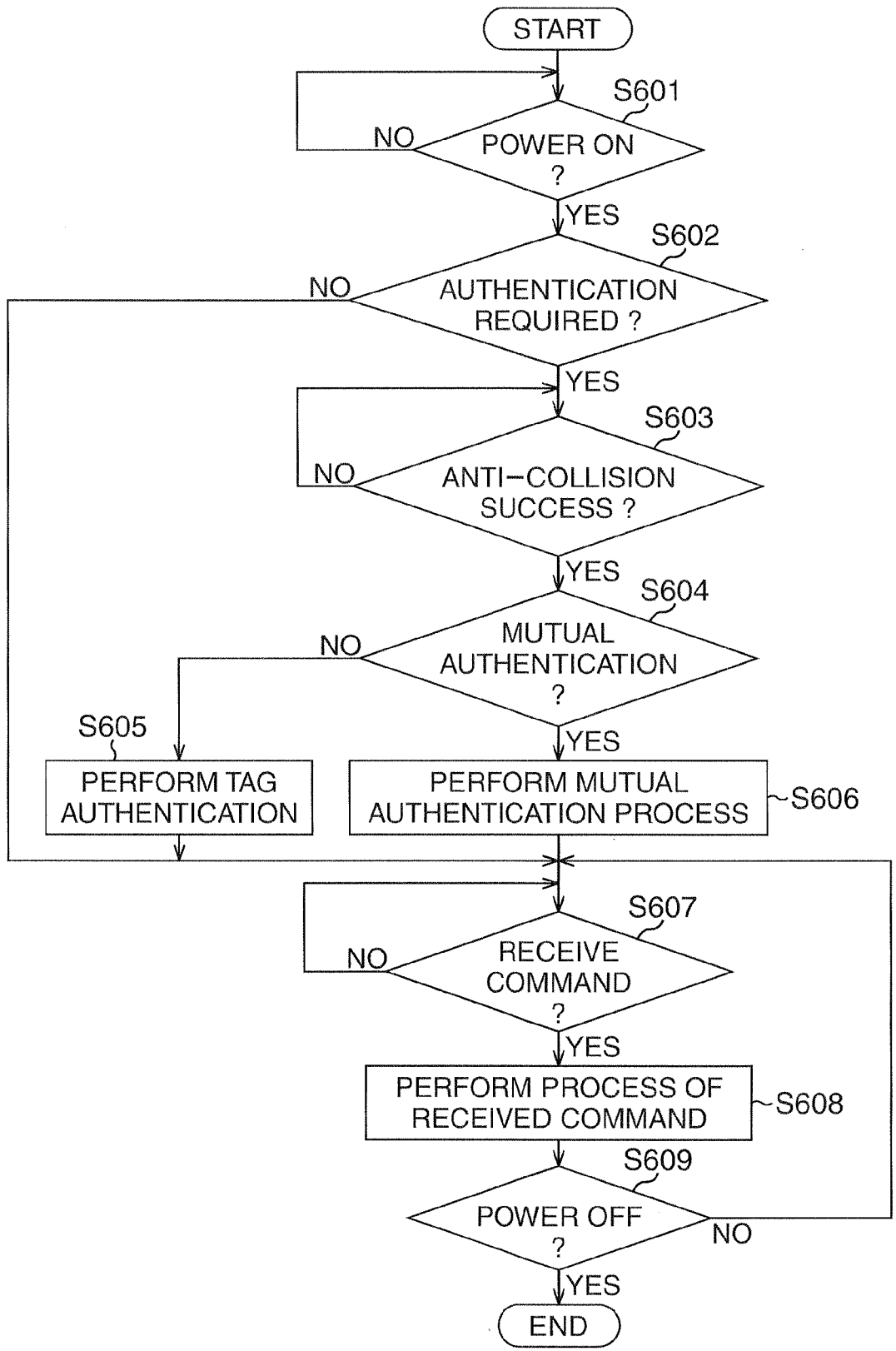

DATA CARRIER AND DATA CARRIER SYSTEM

CROSS-REFERENCE TO RELATED APPLICATION

This application is a National Stage entry of International Application No. PCT/JP2007/066898, having an international filing date of Aug. 30, 2007; which claims priority to Japanese Application No.: 2006-217246, filed Aug. 9, 2006 and Japanese Application No.: 2006-234967, filed Aug. 31, 2006, the disclosure of each of which is hereby incorporated in its entirety by reference.

TECHNICAL FIELD

The present invention relates to a data carrier and a data carrier system, in particular, to preferable technique used for switching levels of authentication performed between the data carrier and a reader/writer device.

BACKGROUND ART

Conventionally, a data carrier system constituted by a data carrier and a reader/writer device to perform contactless data transmission and reception between the data carrier and the reader/writer device is practically applied in various fields. In such a data carrier system, an antenna installed in the data carrier receives an alternating magnetic field of a carrier frequency supplied from the reader/writer device via an antenna circuit to obtain operating power.

Further, it is constituted so that the reader/writer device modulates the magnetic field that it supplies and transmits an inquiry signal including a command and data, and the data carrier demodulates the inquiry signal to receive the command and the data transmitted from the reader/writer device.

By contrast, in the case when the data carrier transmits data to the reader/writer device, an on/off operation of a well-known load switch is performed for a load connected to an antenna circuit installed in the data carrier in accordance with the contents of a response signal to be sent, and thereby, the response is sent. In such a way, it is constituted so that double sideband subcarriers are used as a frequency for responding from the data carrier, with respect to the carrier frequency of the alternating magnetic field supplied from the antenna circuit of the reader/writer device.

The data carrier is constituted to be provided with a storage section to store information and an antenna to transmit/receive information in a contactless manner in order to transmit and receive information in a contactless manner to/from the reader/writer device in use of electromagnetic fields or radio waves, and such a data carrier is utilized in various fields, being referred to as various names such as an RFID, an IC tag, an ID tag, an RF tag, a wireless tag, an electronic tag, a transponder, and the like.

As application examples of the above-described data carrier system, a data carrier is disposed to, for example, vending machines, game machines, electricity meters, gas meters, water meters, home electronics, office automation equipment, productive facilities, and the like, and information such as operation histories, sales records and used amount of these electronic devices is recorded in the storage section of the data carrier.

Since the data carrier is used in various fields, a usage mode thereof varies accordingly, however, there has been suggested technique to confirm whether a device component to which a data carrier is attached is authorized in advance by performing predetermined communication between the data carrier and a reader/writer device (for example, see Patent Document 1).

According to "system for managing consumables in electronic equipment" disclosed in Patent Document 1, data communication is performed between a data carrier attached to a device component and a reader/writer device provided in a device body in which the device component is installed, and thereby, it is possible to read various information stored in the data carrier or to store various information in the data carrier from the reader/writer device.

There is provided a security function in order to prevent information written in the data carrier from being read falsely, or false information from being written in the data carrier. Thereby, only a reader/writer device to transmit a password assigned to the data carrier is allowed to communicate with the data carrier. Accordingly, false access by a third person who does not know the password of the data carrier can be prevented.

Patent Document 1: Japanese Patent Application Laid-Open No. 2001-134151

SUMMARY OF THE INVENTION

A reader/writer device communicating with the data carrier is not only the reader/writer device provided in a device body in which a device component to which the data carrier is attached is installed. For example, in a factory where the device component is manufactured, there is a case that communication is performed with a reader/writer device provided at a checkpoint in a manufacturing process.

Even in distribution of the device component to which the data carrier is attached, there is an occasion when information stored therein is read or written by performing data communication between the data carrier and the reader/writer device.

Further, in a state where the device component is installed in the device body owned by a user, transmission/reception of information is performed between the data carrier attached to the device component and the reader/writer device attached to the device body.

As described above, the state where the data carrier attached to the device component performs transmission/reception of information with the reader/writer device varies accordingly, and there is a case when reading information is not desired according to a communication partner. Thus, a security area enabling a specific communication partner to read is provided in a memory, and access to the security area is performed by an authentication method, resulting that a function to make only the specific communication partner accessible is used.

However, in the case when there exist a plurality of communication partners accessible to the security area, there is a case when information that is not desired to be read according to the communication partner is written in the security area.

In view of the above-described problems, the present invention has an object to provide a data carrier, which includes at least three security areas in a memory region provided in the data carrier, and which is capable of switching authentication methods allowing accesses to the respective security areas depending on a command transmitted from the reader/writer device.

The data carrier of the present invention is a data carrier constituting a data carrier system with a reader/writer device, and the data carrier including: a command holding unit where a region thereof to store authentication commands to perform authentication with the reader/writer device is divided into at least three areas, and as for the three areas, a first authentication command is stored in a first area, a second authentication command is stored in a second area, and a third authentication command is stored in a third area; a signal reception unit receiving an inquiry signal transmitted from the reader/writer device; an authentication command analysis unit analyzing levels of the authentication performed with the reader/writer device from the inquiry signal received by the signal reception unit; an authentication command selection unit selecting the authentication command used in an authentication process performed with the reader/writer device based on an analysis result of the authentication command analysis unit; a command reading unit reading the authentication command selected by the authentication command selection unit from the command holding unit; and a signal transmission unit transmitting the inquiry signal in which the authentication command read by the command reading unit is used to the reader/writer device.

The data carrier system of the present invention is a data carrier system constituted by a data carrier and a reader/writer device communicating with the data carrier, and in which the data carrier includes: a command holding unit where a region thereof to store authentication commands to perform authentication with the reader/writer device is divided into at least three areas, and as for the three areas, a first authentication command is stored in a first area, a second authentication command is stored in a second area, and a third authentication command is stored in a third area; a signal reception unit receiving an inquiry signal transmitted from the reader/writer device; an authentication command analysis unit analyzing levels of the authentication performed with the reader/writer device from the inquiry signal received by the signal reception unit; an authentication command selection unit selecting the authentication command used in an authentication process performed with the reader/writer device based on an analysis result of the authentication command analysis unit; a command reading unit reading the authentication command selected by the authentication command selection unit from the command holding unit; and a signal transmission unit transmitting the inquiry signal in which the authentication command read by the command reading unit is used to the reader/writer device.

BRIEF DESCRIPTION OF THE DRAWINGS

FIG. 4 is a waveform diagram explaining one example of a data carrier signal;

FIG. 6 is a flowchart explaining an example of communication by the data carrier system using the data carrier in the embodiment of the present invention.

DETAILED DESCRIPTION OF THE PREFERRED EMBODIMENTS

Hereinafter, an embodiment of a data carrier system of the present invention will be described with reference to the drawings.

Figure 1:
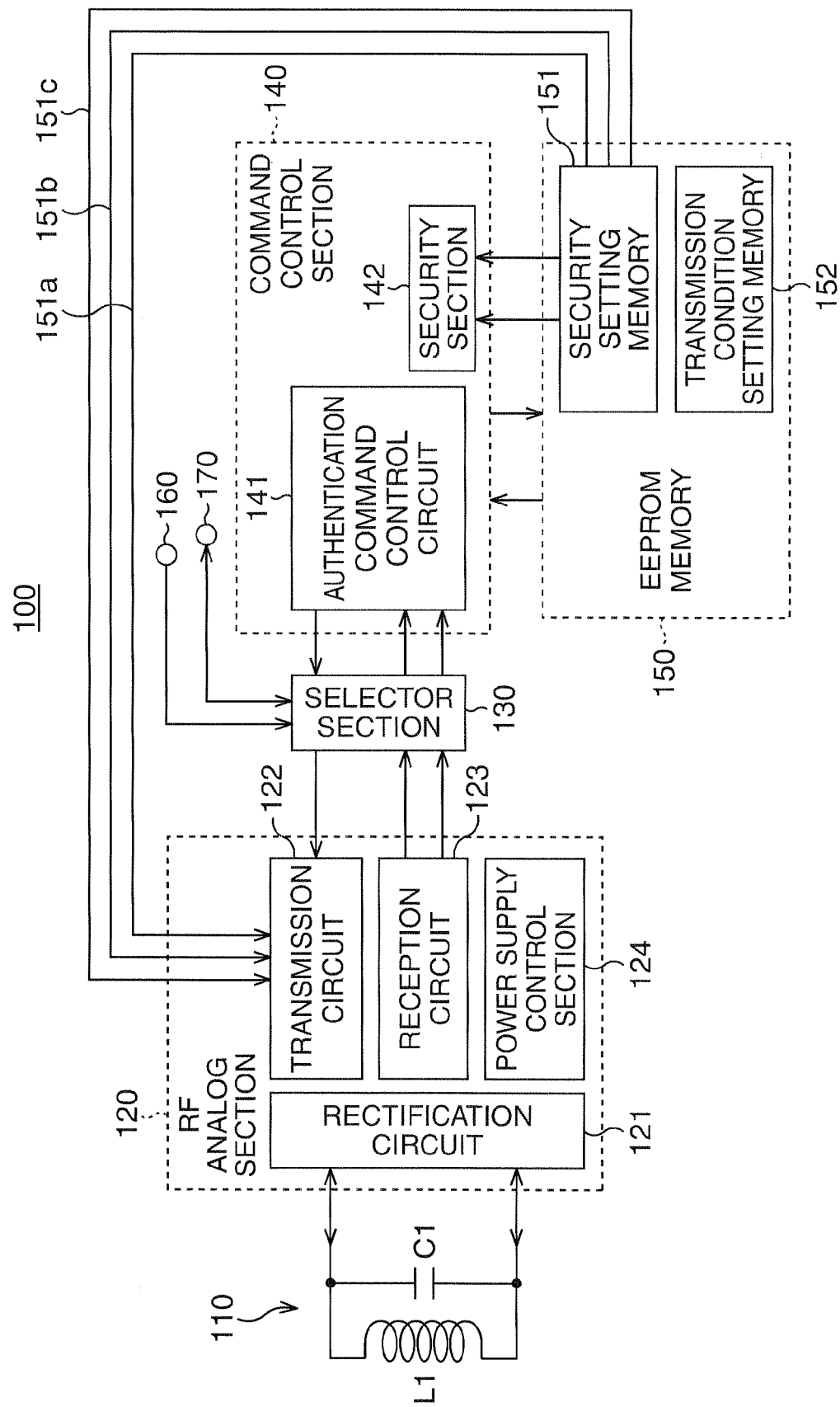
FIG. 1 is a block diagram showing a constitution example of a data carrier according to an embodiment of the present invention.

As shown in FIG. 1, a data carrier 100 in this embodiment is constituted by an antenna circuit 110, an RF analog section 120, a selector section 130, a command control section 140, a storage section 150, a first contact terminal 160, a second contact terminal 170, and so on.

The antenna circuit 110 is constituted by a parallel resonant circuit made by a coil L1 and a capacitor C1.

The RF analog section 120 is constituted by a rectification circuit 121, a transmission circuit 122, a reception circuit 123, a power supply control section 124, and so on.

The command control section 140 includes an authentication command control circuit 141 and a security section 142. The storage section 150 includes a security setting memory 151 and a transmission condition setting memory 152.

In this embodiment, a first security area 151a, a second security area 151b, and a third security area 151c are provided in the security setting memory 151. And then, in the example in FIG. 3, "a first command (1)" is stored in 1-1 of address 1 in the first security area 151a. Further, "a first command (2)" is stored in 1-2 of address 2 in the first security area 151a. Also, "a first command (3)" is stored in 1-3 of address 3 in the first security area 151a.

Further, "a second command (1)" is stored in 2-1 of address 1 in the second security area 151b. "A second command (2)" is stored in 2-2 of address 2 in the second security area 151b. In addition, "a second command (3)" is stored in 2-3 of address 3 in the second security area 151b.

Further, "a third command (1)" is stored in 3-1 of address 1 in the third security area 151c. "A third command (2)" is stored in 3-2 of address 2 in the third security area 151c. In addition, "a third command (3)" is stored in 3-3 of address 3 in the third security area 151c.

Concretely, a command to be used in "a direct method" is stored in the first security area 151a. Further, a command to be used in "a tag authentication method" is stored in the second security area 151b. In addition, a command to be used in "a mutual authentication method" is stored in the third security area 151c.

Then, depending on control of the command control section 140, one of the first commands (1) to (3), the second commands (1) to (3), and the third commands (1) to (3) is read from the security setting memory 151 to be provided to the transmission circuit 122.

Figure 2:
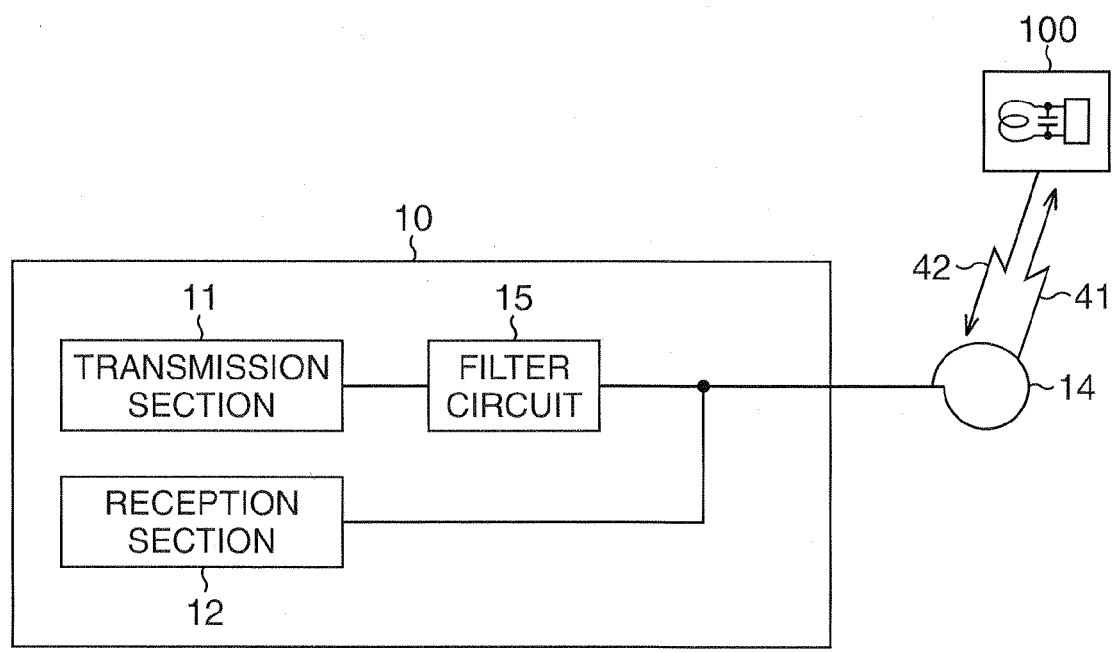
FIG. 2 is a diagram explaining a schematic constitution of a data carrier system constituted by a reader/writer device and the data carrier according to the embodiment of the present invention.

As shown in FIG. 2, a reader/writer device 10 that communicates with the above-described data carrier 100 is constituted by a transmission section 11, a reception section 12, an antenna circuit 14, a filter circuit 15, and so on. And then, commands and data are transmitted to the data carrier 100 from the antenna circuit 14, and transmission/reception is performed between the reader/writer device 10 and the data carrier 100.

The transmission section 11 is to generate a transmission signal made by the command and the data to be transmitted to the data carrier 100, and is constituted by a computer system such as a CPU, an RAM, and an ROM which are not shown, and modulates a predetermined carrier frequency $f_0$ (13.56 MHz) to generate the transmission signal. The reception section 12 decodes a subcarrier frequency transmitted from the data carrier 100 to demodulate the data.

The antenna circuit 14 transmits the transmission signal output from the transmission section 11 to the data carrier 100 and receives a response signal transmitted from the data carrier 100. The above-descried constitution is a general constitution of the data carrier 100 applied in the data carrier system, however, the data carrier 100 in this embodiment has a characteristic that is applicable to both proximity-type data communication and vicinity-type data communication.

Figure 3:
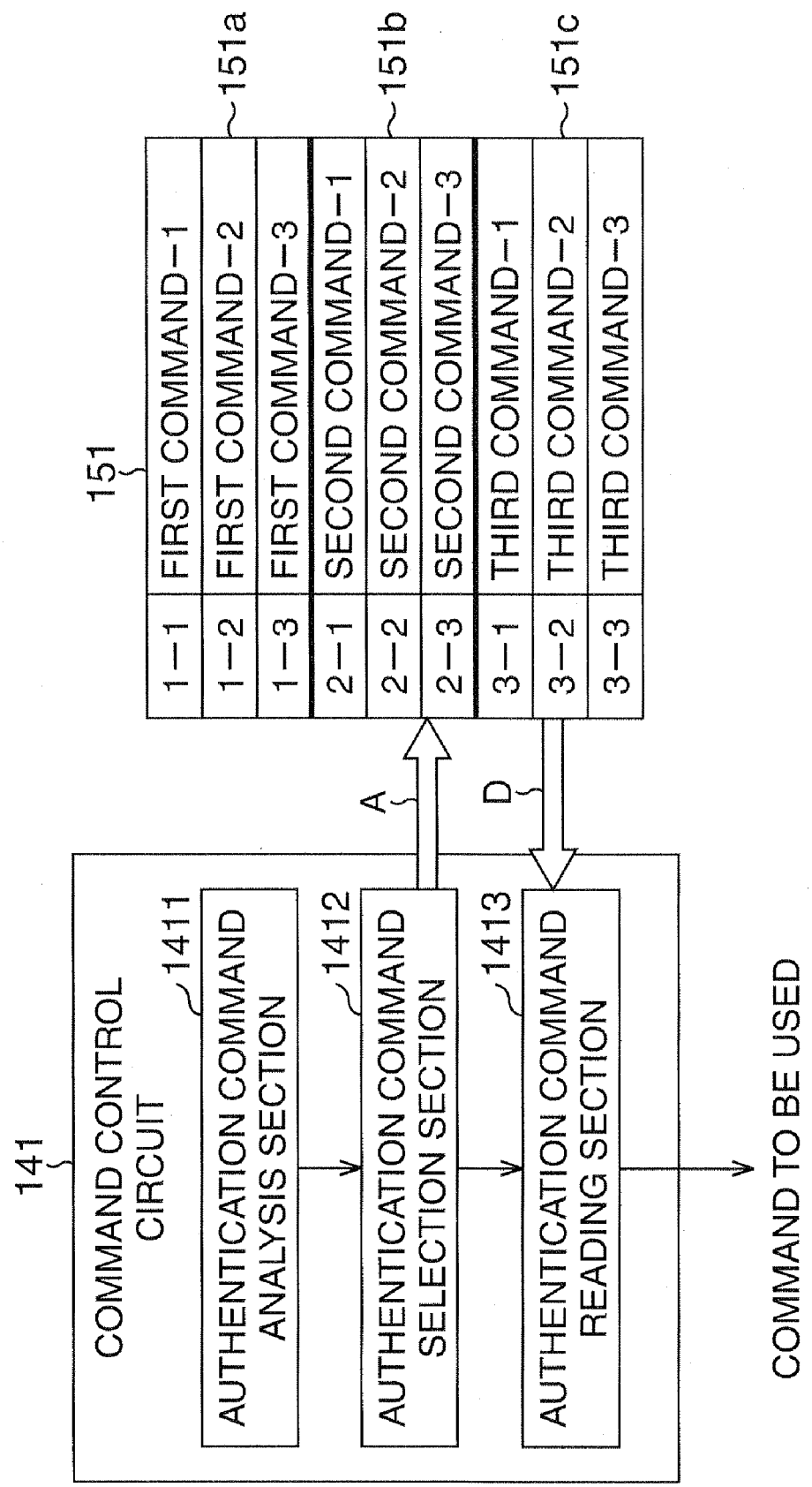
FIG. 3 is a view showing a configuration example of an authentication command control circuit of the embodiment of the present invention and explaining an example of reading one of commands suitable for a security level.

FIG. 3 shows one example of a constitution in which a command is read from one of the first security area 151a, the second security area 151b and the third security area 151c.

As shown in FIG. 3, the authentication command control circuit 141 in this embodiment includes an authentication command analysis section 1411, an authentication command selection section 1412, and an authentication command reading section 1413.

The authentication command analysis section 1411 is to determine whether an inquiry signal 41 transmitted from the reader/writer device 10 is the command in "the direct method", the command in "the tag authentication method", or the command in "the mutual authentication method", and outputs the determination result to the authentication command selection section 1412.

The authentication command selection section 1412 is to select a command of a security area to be used for a response signal 42 to be transmitted to the reader/writer device 10 depending on an analysis result of the command transmitted from the authentication command analysis section 1411, and specifies an address A where the command of the type to be selected is stored to the security setting memory 151.

The authentication command reading section 1413 reads data D of the command of the security area selected by the authentication command selection section 1412 from the security setting memory 151 as a command used to communicate with the reader/writer device 10, and as shown in FIG. 1, outputs one of the commands read from the first security area 151a, the second security area 151b, and the third security area 151c to the transmission circuit 122.

The data carrier 100 in this embodiment is constituted to be capable of selecting either proximity communication or vicinity communication in addition to switching of the above-described security levels. That is, it is constituted so that, as shown in FIG. 4, double sideband subcarriers of a first subcarrier frequency fsc1 and a second subcarrier frequency fsc2 are used with respect to a carrier frequency of an alternating magnetic field supplied from the antenna circuit in the reader/writer device as a frequency for the response signal 42 in response to the inquiry signal 41 transmitted from the reader/writer device 10.

As shown in the explanatory diagram of the carrier frequency in FIG. 4, in this embodiment, the first subcarrier frequency fsc1 (847.5 kHz) is used as a primary proximity communication command (PICC command) and the second subcarrier frequency fsc2 (437.75 kHz) is used as a vicinity communication command (VICC command). In its reception characteristic, the center frequency is 13.56 MHz, the communication speed is 105.94 kbps, and the modulation method is ASK (NRZ). Also, in its transmission characteristic, the center frequency is 13.56 MHz, the communication speed is 105.94 kbps, and the modulation method is BPSK (NRZ).

Further, in this embodiment, it is constituted so that subcarrier intensity can be changed by increasing or reducing a load. It is constituted so that the degree of the change can be changed in eight levels in each of the PICC command and the VICC command. Further, the relative ratio of the PICC command to the VICC command is set to be about 1:3.

Next, a usage example of the data carrier 100 in this embodiment constituted as described above will be described with reference to FIGS. 5A to 5D.

Figure 5A:
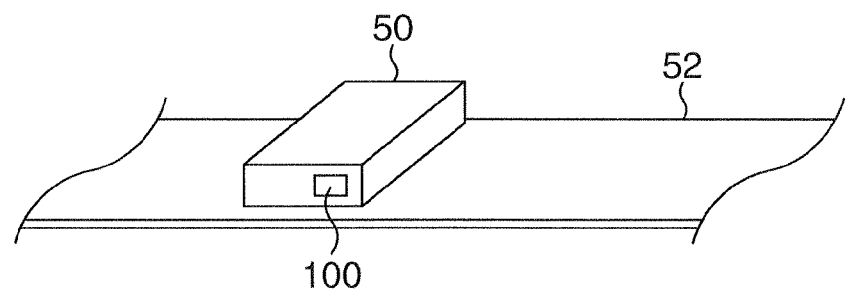
FIG. 5A is a view showing a state in which the data carrier is attached to a device component.

FIG. 5A shows a state where the data carrier 100 is attached to a device component 50, and for example, the device component 50 is mounted on a conveyor belt 52 and manufacturing information such as "serial number", "date of manufacture", "names of materials", and "shipping date" is written in the data carrier 100 in each process of a manufacturing factory of the device component 50. The proximity communication command is used in this state.

Figure 5B:
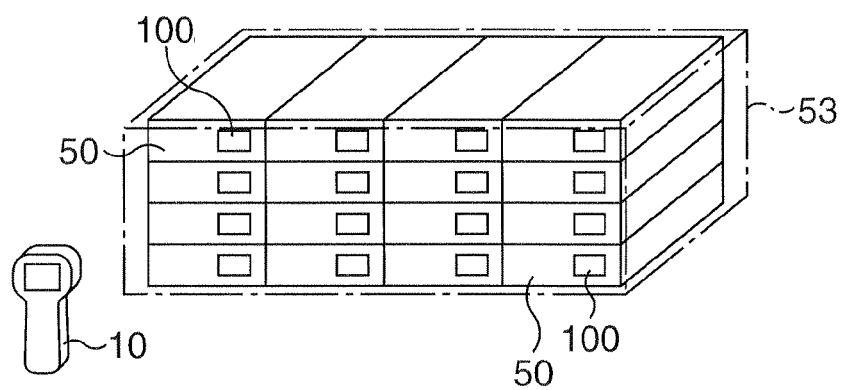
FIG. 5B is a view showing a state in which the data carriers attached to the device components are packed in a cardboard box and shipped from a factory to be utilized in a distribution management.

FIG. 5B shows a state where the data carriers 100 attached to the device components 50 are packed in a cardboard box 53 and shipped from the factory to be used in a distribution management. In this state, the reader/writer device 10 transmits the inquiry signal 41 from outside the cardboard box 53, so the distance from the data carrier 100 to the reader/writer device 10 is far away. Accordingly, in this state, the inquiry signal 41 is transmitted from the reader/writer device 10 by the vicinity communication command (VICC command).

The data carrier 100 to which the inquiry signal 41 of the vicinity communication command (VICC command) is transmitted is necessary to use the vicinity communication command (VICC command) as the response signal 42 to be transmitted. In the data carrier 100 in this embodiment, as described above, both of the proximity communication command (PICC command) and the vicinity communication command (VICC command) are stored in the transmission condition setting memory 152. Thereby, both of these commands can be selectively used, resulting that the data carrier 100 can be suitably used even in a state where the device component 50 is packed in the cardboard box 53.

Further, in the above case, not only "tag authentication" in which the reader/writer device 10 authenticates the data carrier 100 but also "mutual authentication" in which the data carrier 100 authenticates the reader/writer device 10 is performed. Detailed explanations of "the tag authentication" and "the mutual authentication" will be described later with reference to the flowchart in FIG. 6.

Figure 5C:
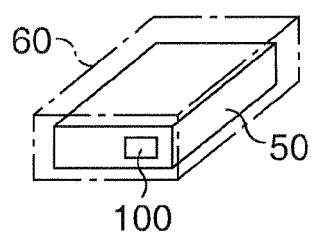
FIG. 5C is a view showing a state in which the device component is packed alone in a cardboard box.

FIG. 5C shows a state where the device component 50 is packed alone in a cardboard box 60. The typical example of this state is that the device components 50 are displayed on store shelves in a general merchandising store. In this state, information such as "serial number", "maintenance information", "shipping date", and "price" is read from among various information stored in the data carrier 100.

Figure 5D:
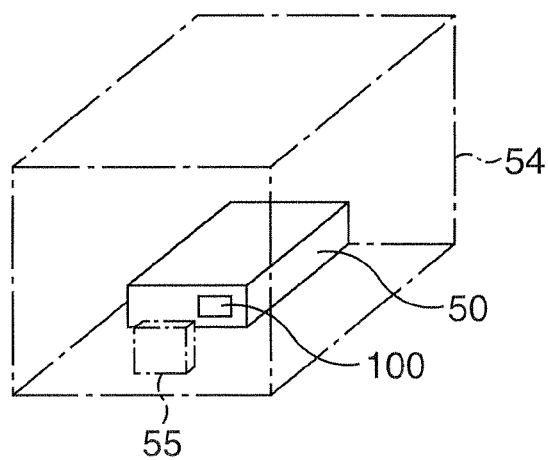
FIG. 5D is a view showing a state in which the device component is installed in a device body for use.

FIG. 5D shows a state where the device component 50 is installed in a device body 54. In this state, since the distance from the data carrier 100 to a reader/writer device 55 provided to the device body 54 results in a close range, communication between the device component 50 and the reader/writer device 55 is performed by the proximity communication command (PICC command).

An example of communication by the data carrier system using the data carrier 100 in this embodiment will be described with reference to the flowchart in FIG. 6.

As shown in FIG. 6, firstly at Step S601, the data carrier 100 is being on standby for "power on" after the inquiry signal 41 is transmitted from the reader/writer device 10.

When operating power is generated in the data carrier 100 by the inquiry signal 41 being transmitted from the reader/writer device 10, the process proceeds to Step S602 to determine whether or not authentication is required based on the inquiry signal 41. As a result of this determination, when authentication is required, the process proceeds to Step S603 to determine whether or not an anti-collision process is successful.

When the anti-collision process is successful, the process proceeds to Step S604 to determine whether or not the authentication is "the mutual authentication". As a result of this determination, when the authentication is not "the mutual authentication", the process proceeds to Step S605 to perform "the tag authentication". Otherwise, as a result of the determination at Step S604, when the authentication is "the mutual authentication", the process proceeds to Step S606 to perform "the mutual authentication". The security determinations at Steps S602 and S604 are performed by the authentication command analysis section 1411 provided in the above-described authentication command control circuit 141.

As described above, the data carrier 100 in this embodiment is constituted to be able to set three security levels of "without authentication", "tag authentication" and "mutual authentication". "Without authentication" has an advantage of being capable of high-speed access because of proceeding directly from "power on" to a command receiving state at Step S607.

"The tag authentication" performed at Step S605 is performed by the authentication command of a tag (the data carrier), thereby, the reader/writer device 10 can authenticate that the data carrier 100 is legitimate. "The mutual authentication" is referred to as a challenge response authentication method and "a seed value S" generated in the reader/writer device 10 is transmitted to the data carrier 100. The data carrier 100 that receives "the seed value S" responds with "an authentication value N" calculated.

The reader/writer device 10 verifies whether or not "the authentication value N" transmitted from the data carrier 100 is correct (a legitimate tag). Here, "the seed value S" is a scrambled value, and thus is changed in every authentication.

By contrast, "the mutual authentication" performed at Step S606 is the authentication mutually performed between the reader/writer device 10 and the data carrier 100. As for the sequence of authentication in this embodiment, authentication of the data carrier 100 is performed after authentication of the reader/writer device 10 is performed.

That is, after the process of "the tag authentication" described at Step S605 ends, "a seed value S'" generated in the data carrier 100 is transmitted to the reader/writer device 10. The reader/writer device 10 that receives "the seed value S'" responds with "an authentication value N'" calculated.

As described above, after "the tag authentication" at Step S605 or "the mutual authentication" at Step S606 ends, the process proceeds to Step S607 and the data carrier 100 becomes in a standby state of command receiving. Then, when a command is transmitted from the reader/writer device 10, the process proceeds to Step S608, and then, a process according to the transmitted command is performed.

Next, at Step S609, the data carrier 100 determines whether or not the power is off. As a result of this determination, when the power is on, the process returns to Step S607 to be in the standby state of command receiving. Further, as a result of the determination at Step S609, when the power is off, the communication process with the reader/writer device 10 ends.

As described above, it is constituted so that the three security levels of "without authentication", "tag authentication" and "mutual authentication" are provided and a setting thereof can be switched by selecting the type of command. Accordingly, in the data carrier 100 in which a CPU is not provided, a necessary security level can be selected from among the three security levels.

Further, the data carrier 100 in this embodiment can be operated by not only the proximity communication command (PICC command) but also the vicinity communication command (VICC command), and thereby, all of recording the manufacturing information in the manufacturing factory, recording related to the distribution management, and recording related to a management of a state of use can be well performed with the single data carrier.

Therefore, it is not necessary to attach both of the data carrier of the proximity communication command (PICC command) and the data carrier of the vicinity communication command (VICC command) to a component in order to perform a manufacturing process management, a distribution process management, and a usage process management consistently as has been done conventionally, and a cost necessary for an information management can be reduced considerably.

INDUSTRIAL APPLICABILITY

According to the present invention, a region where authentication commands to perform authentication between a data carrier and a reader/writer device are stored is divided into at least three areas, and as for the three areas, a first authentication command is stored in a first area, a second authentication command is stored in a second area, and a third authentication command is stored in a third area, which makes it possible to provide a data carrier capable of switching authentication methods allowing an access to a security area depending on a command transmitted from the reader/writer device.

What is claimed is:

1. A data carrier constituting a data carrier system with a reader/writer device, the data carrier comprising:
   a command holding unit where a region thereof to store authentication commands to perform authentication with the reader/writer device is divided into at least three areas, as for the three areas, a first authentication command is stored in a first area, a second authentication command is stored in a second area, and a third authentication command is stored in a third area;
   a signal reception unit receiving an inquiry signal transmitted from the reader/writer device;
   an authentication command analysis unit analyzing levels of authentication performed with the reader/writer device from the inquiry signal received by the signal reception unit;
   an authentication command selection unit selecting the authentication command used in an authentication process performed with the reader/writer device based on an analysis result of the authentication command analysis unit;
   a command reading unit reading the authentication command selected by the authentication command selection unit from the command holding unit; and
   a signal transmission unit transmitting the inquiry signal in which the authentication command read by the command reading unit is used to the reader/writer device.

2. The data carrier according to claim 1, wherein the command stored in the first area is a command to be used without authentication communication, the command stored in the second area is a command to be used for tag authentication communication, and the command stored in the third area is a command to be used as mutual authentication communication.

3. The data carrier according to claim 1, wherein
   the authentication command analysis unit, and the authentication command selection unit, and the command reading unit are constituted as hardware, and switching security levels is performed without a CPU.

4. The data carrier according to claim 2, wherein the authentication command analysis unit, and the authentication command selection unit, and the command reading unit are constituted as hardware, and switching security levels is performed without a CPU.

5. The data carrier according to claim 1, wherein the authentication command analysis unit analyzes whether a command is a proximity communication command or a vicinity communication command based on a subcarrier frequency, a communication speed or load modulation intensity of the signal received by the signal reception unit.

6. The data carrier according to claim 2, wherein the authentication command analysis unit analyzes whether a command is a proximity communication command or a vicinity communication command based on a subcarrier frequency, a communication speed or load modulation intensity of the signal received by the signal reception unit.

7. The data carrier according to claim 3, wherein the authentication command analysis unit analyzes whether a command is a proximity communication command or a vicinity communication command based on a subcarrier frequency, a communication speed or load modulation intensity of the signal received by the signal reception unit.

8. The data carrier according to claim 4, wherein the authentication command analysis unit analyzes whether a command is a proximity communication command or a vicinity communication command based on a subcarrier frequency, a communication speed or load modulation intensity of the signal received by the signal reception unit.

9. A data carrier system comprising:
a data carrier; and
a reader/writer device communicating with the data carrier, and wherein
the data carrier comprises:
a command holding unit where a region thereof to store authentication commands to perform authentication with the reader/writer device is divided into at least three areas, and as for the three areas, a first authentication command is stored in a first area, a second authentication command is stored in a second area, and a third authentication command is stored in a third area;
a signal reception unit receiving an inquiry signal transmitted from the reader/writer device;
an authentication command analysis unit analyzing levels of authentication performed with the reader/writer device from the inquiry signal received by the signal reception unit;
an authentication command selection unit selecting the authentication command used in an authentication process performed with the reader/writer device based on an analysis result of the authentication command analysis unit;
a command reading unit reading the authentication command selected by the authentication command selection unit from the command holding unit; and
a signal transmission unit transmitting the inquiry signal in which the authentication command read by the command reading unit is used to the reader/writer device.

10. The data carrier system according to claim 9, wherein the command stored in the first area is a command to be used without authentication communication, the command stored in the second area is a command to be used for tag authentication communication, and the command stored in the third area is a command to be used as mutual authentication communication.

11. The data carrier system according to claim 9, wherein the authentication command analysis unit, and the authentication command selection unit, and the command reading unit are constituted as hardware, and switching security levels is performed without a CPU.

12. The data carrier system according to claim 10, wherein the authentication command analysis unit, and the authentication command selection unit, and the command reading unit are constituted as hardware, and switching security levels is performed without a CPU.

13. The data carrier system according to claim 9, wherein the authentication command analysis unit analyzes whether a command is a proximity communication command or a vicinity communication command based on a subcarrier frequency, a communication speed or load modulation intensity of the signal received by the signal reception unit.

14. The data carrier system according to claim 10, wherein the authentication command analysis unit analyzes whether a command is a proximity communication command or a vicinity communication command based on a subcarrier frequency, a communication speed or load modulation intensity of the signal received by the signal reception unit.

15. The data carrier system according to claim 11, wherein the authentication command analysis unit analyzes whether a command is a proximity communication command or a vicinity communication command based on a subcarrier frequency, a communication speed or load modulation intensity of the signal received by the signal reception unit.

16. The data carrier system according to claim 12, wherein the authentication command analysis unit analyzes whether a command is a proximity communication command or a vicinity communication command based on a subcarrier frequency, a communication speed or load modulation intensity of the signal received by the signal reception unit.

* * * * *